(12) United States Patent
Suonvieri (10) Patent No.: US 7,831,273 B2
(45) Date of Patent: Nov. 9, 2010

(54) POWER EFFICIENT WIRELESS TRANSMISSION

(75) Inventor: Jukka Suonvieri, Terūlahti (FI)

(73) Assignee: Nokia Siemens Networks Oy, Espoo (FI)

( * ) Notice: Subject to any disclaimer, the term of this patent is extended or adjusted under 35 U.S.C. 154(b) by 863 days.

(21) Appl. No.: 11/698,126

(22) Filed: Jan. 26, 2007

(65) Prior Publication Data

US 2007/0191051 A1    Aug. 16, 2007

(30) Foreign Application Priority Data

Jan. 27, 2006   (FI)   .................................. 20065057

(51) Int. Cl.
*H04Q 7/20*   (2006.01)

(52) U.S. Cl. ...................... 455/522; 455/69; 455/127.1; 455/500; 455/68; 455/426.1; 370/331; 370/310; 370/337; 370/338; 370/329

(58) Field of Classification Search ................. 455/522, 455/69, 127.1, 500, 517, 68, 63.11, 436–444, 455/432.1, 432.2, 434, 550.1, 552.1, 426.1, 455/426.2, 422.1, 403; 370/331, 310, 337, 370/338, 329, 347, 350
See application file for complete search history.

(56) References Cited

U.S. PATENT DOCUMENTS

| 6,151,310 | A | * | 11/2000 | Dent | ........................... 370/330 |
|---|---|---|---|---|---|
| 6,275,487 | B1 | | 8/2001 | Szalajski et al. | |
| 6,823,193 | B1 | * | 11/2004 | Persson et al. | ............... 455/522 |
| 6,853,633 | B1 | * | 2/2005 | Ramesh | ...................... 370/347 |
| 2004/0142715 | A1 | | 7/2004 | Oses | |
| 2007/0111746 | A1 | * | 5/2007 | Anderson | ................... 455/522 |

FOREIGN PATENT DOCUMENTS

| EP | 0893889 | 1/1999 |
|---|---|---|
| EP | 1326350 | 7/2003 |
| WO | WO 95/33313 | 12/1995 |
| WO | WO 98/28859 | 7/1998 |

OTHER PUBLICATIONS

Official Action issued in Finnish Priority Application No. FI20065057.

* cited by examiner

*Primary Examiner*—Keith T Ferguson
(74) *Attorney, Agent, or Firm*—Squire, Sanders & Dempsey L.L.P.

(57) ABSTRACT

A solution for power efficient transmission in a wireless telecommunication system is provided. The telecommunication system utilizes a time slot based data transmission scheme. According to the provided solution, at least a portion of time slots is allocated to a broadcast control channel on a given frequency and to at least one different channel. The transmit power levels of the time slot or time slots allocated to another channel or other channels than the broadcast control channel are then adjusted on the basis of contents of the time slots. The broadcast signal is then transmitted with a given transmit power level on a time slot allocated to the broadcast control channel, and a signal or signals on other time slots are transmitted with the adjusted transmit power level.

25 Claims, 3 Drawing Sheets

Fig 9

POWER EFFICIENT WIRELESS TRANSMISSION

FIELD

The invention relates to a power efficient transmission in a wireless telecommunication system.

BACKGROUND

In radio access networks and environments, there may arise situations in which power sources of network elements may not provide enough power for the network elements. In rural environments, for example, there may be areas where traffic is low or very low and air interface capacity provided by the radio access network is mostly free. In such environments, a solar cell power generator or another solution without long wires to mains may be used. Another network element providing radio coverage is a repeater which may also use weak power sources. Weak power sources may also be used as a back up power source for power failure in the mains power supply. The power sources mentioned above may lack power output capacity, if a continuous high power output capacity is required. For example, the power consumption of a standard base station of a GSM (Global System for Mobile Communications) transmitting continuously with even only one transmitter may be too high for a solar cell power generator. In such cases, it may be necessary to limit power consumption of the network element. In cases of power failures, the reduced power consumption of network elements is advantageous for prolonged operation of the network elements using a backup battery.

BRIEF DESCRIPTION OF THE INVENTION

An object of the invention is to provide an improved solution for signal transmission in a wireless telecommunication system in which the data transmission on a given frequency band is divided into a plurality of time slots or corresponding air interface channels.

According to an aspect of the invention, there is provided a transmission method in a wireless telecommunication system in which the data transmission on a given frequency band is divided into a plurality of time slots. The method comprises allocating at least a portion of the time slots of the frequency band to a broadcast control channel and at least one different channel. The method further comprises adjusting a transmit power level of at least one time slot in a different channel on the basis of contents of the time slot in the different channel, transmitting a broadcast signal with a given transmit power in a time slot allocated to the broadcast control channel, and transmitting a signal with the adjusted transmit power level in the time slot of the different channel.

According to another aspect of the invention, there is provided an arrangement in a radio access network of a wireless telecommunication system in which the data transmission on a given frequency band is divided into a plurality of time slots. The arrangement comprises a controller configured to allocate at least a portion of the time slots of the frequency band to a broadcast control channel and at least one different channel. The arrangement further comprises a transmitter configured to adjust a transmit power level of at least one time slot in a different channel on the basis of contents of the time slot in the different channel, transmit a broadcast signal with a given transmit power in a time slot allocated to the broadcast control channel, and transmit a signal with the adjusted transmit power level in the time slot of the different channel.

According to another aspect of the invention, there is provided a base station controller apparatus, configured to divide data transmission on a given frequency band into a plurality of time slots and allocate at least a portion of the time slots of the frequency band to a broadcast control channel and at least one different channel, to assign a transmit power level of at least one time slot in a different channel on the basis of contents of the time slot in the different channel, and to control a base station to transmit a broadcast signal with a given transmit power in a time slot allocated to the broadcast control channel and a signal with the assigned transmit power level in the time slot of the different channel.

According to another aspect of the invention, there is provided a base station of a radio access network in a wireless telecommunication system in which the data transmission on a given frequency band is divided into a plurality of time slots. The base station comprises a first communication unit connected to a controller of the base station, a second communication unit configured to transmit and receive radio signals, and a processing unit configured to receive through the first communication unit a command to allocate at least a portion of the time slots of the frequency band to a broadcast control channel and at least one different channel, control the second communication unit to transmit a broadcast signal with a given transmit power in a time slot allocated to the broadcast control channel. The processing unit is further configured to adjust a transmit power level of at least one time slot in a different channel on the basis of contents of the time slot in the different channel, and control the second communication unit to transmit a signal with the adjusted transmit power level in the time slot of the different channel.

According to another aspect of the invention, there is provided a base station of a radio access network in a wireless telecommunication system. The base station comprises a communication unit configured to transmit a pilot signal to an air interface on a specific pilot channel. The base station further comprises a processing unit configured to adjust the transmit power level of the pilot signal according to a specific transmit power level pattern which describes a variable transmit power level for the pilot signal.

According to another aspect of the invention, there is provided a computer program product encoding a computer program of instructions for executing a computer process for data transmission in a wireless telecommunication system in which the data transmission on a given frequency band is divided into a plurality of time slots. The process comprises allocating at least a portion of the time slots of the frequency band to a broadcast control channel and at least one different channel. The process further comprises adjusting a transmit power level of at least one time slot in a different channel on the basis of contents of the time slot in the different channel, transmitting a broadcast signal with a given transmit power in a time slot allocated to the broadcast control channel, and transmitting a signal with the adjusted transmit power level in the time slot of the different channel.

According to another aspect of the invention, there is provided a computer program distribution medium readable by a computer and encoding a computer program of instructions for executing a computer process for data transmission in a wireless telecommunication system in which the data transmission on a given frequency band is divided into a plurality of time slots. The process comprises allocating at least a portion of the time slots of the frequency band to a broadcast control channel and at least one different channel. The process further comprises adjusting a transmit power level of at least one time slot in a different channel on the basis of contents of the time slot in the different channel, transmitting a broadcast signal with a given transmit power in a time slot allocated to the broadcast control channel, and transmitting a signal with the adjusted transmit power level in the time slot of the different channel.

According to another aspect of the invention, there is provided a method, comprising: receiving, from a mobile terminal served by a serving base station, reception power level measurement information related to signals received by the mobile terminal from the serving base station and from one or more handover candidate base stations, wherein the base stations transmit signals in time slots with variable transmit power levels, obtaining knowledge on transmit power levels of the signals measured by the mobile terminal, compensating the received reception power level measurement information according to the knowledge on the transmit power levels, and determining, on the basis of compensated reception power level measurement information, whether or not to initiate a handover procedure for the mobile terminal.

According to another aspect of the invention, there is provided a base station controller apparatus, comprising a communication interface configured to provide a communication connection with one or more base stations controlled by the base station controller apparatus and transmitting signals in time slots with variable transmit power levels under the control of the base station controller apparatus. The base station controller apparatus further comprises a processing unit configured to receive, through the communication interface reception power level measurement information related to signals received by a mobile terminal from a serving base station and from one or more handover candidate base stations, obtain knowledge on transmit power levels of the signals measured by the mobile terminal, compensate the received reception power level measurement information according to the knowledge on the transmit power levels, and determine, on the basis of compensated reception power level measurement information, whether or not to initiate a handover procedure for the mobile terminal.

According to another aspect of the invention, there is provided a base station controller apparatus, comprising communication means for providing a communication connection with one or more base stations controlled by the base station controller apparatus and transmitting signals in time slots with variable transmit power levels under the control of the base station controller apparatus, memory means capable of storing information, and means for storing into the memory means information on the transmit power levels of the one or more base stations. The base station controller apparatus further comprises means for receiving, through the communication means from a mobile terminal served by a serving base station, reception power level measurement information related to signals received by the mobile terminal from the serving base station and from one or more handover candidate base stations, means for obtaining knowledge on transmit power levels of the signals measured by the mobile terminal, means for compensating the received reception power level measurement information according to the knowledge on the transmit power levels, and means for determining, on the basis of compensated reception power level measurement information, whether or not to initiate a handover procedure for the mobile terminal.

According to another aspect of the invention, there is provided a computer program distribution medium readable by a computer and encoding a computer program of instructions for executing a computer process, comprising: receiving, from a mobile terminal served by a serving base station, reception power level measurement information related to signals received by the mobile terminal from the serving base station and from one or more handover candidate base stations, wherein the base stations transmit signals in time slots with variable transmit power levels, obtaining knowledge on transmit power levels of the signals measured by the mobile terminal, compensating the received reception power level measurement information according to the knowledge on the transmit power levels, and determining, on the basis of compensated reception power level measurement information, whether or not to initiate a handover procedure for the mobile terminal.

The invention provides several advantages. The power consumption of the transmitter is lower by virtue of the power adjustment related to the time slots comprising no data or control signal to be transmitted. Accordingly, limited power resources, such as batteries providing power to the transmitter, will work for longer periods. Additionally, the quality of the radio access network will be better, since the interference in the radio access network will be lower due to the power adjustment. This increases the capacity of the radio access network and improves quality of service.

LIST OF DRAWINGS

In the following, the invention will be described in greater detail with reference to the embodiments and the accompanying drawings, in which FIG. 1 a wireless telecommunication system in which embodiments of the invention may be implemented.

DESCRIPTION OF EMBODIMENTS

Figure 1:
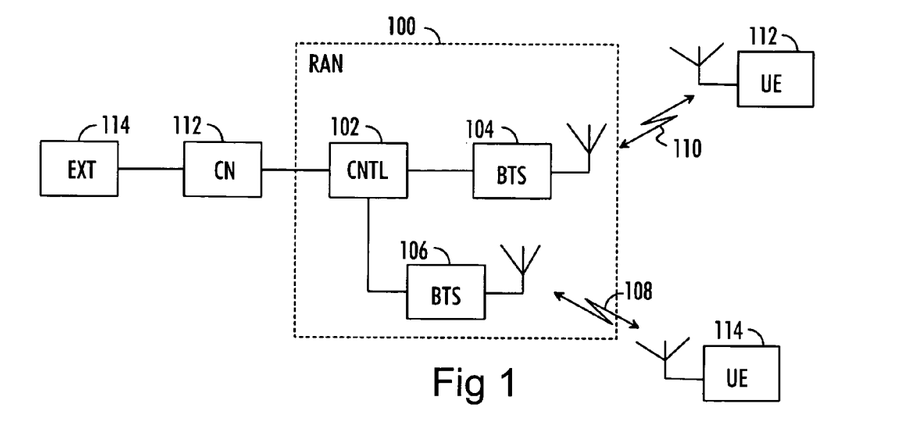

With reference to FIG. 1, let us examine an example of a wireless telecommunication system in which embodiments of the invention can be applied. In the wireless telecommunication system, the data transmission on a given frequency band is divided into a plurality of time slots. Accordingly, one or more time slots are allocated to data to be transmitted and the data is transmitted in the allocated time slots. The wireless telecommunication system may preferably be a GSM-based cellular telecommunication system but the invention may be implemented in other cellular telecommunication systems, too.

The network elements of the telecommunication system of FIG. 1 can be grouped into a radio access network (RAN) 100 that handles all radio-related functionalities of the system, and a core network (CN) 112 which takes care of switching and routing calls and data connections to external networks 114. The external network may be, for example, the Internet, Integrated Services Digital Network (ISDN), or Public Switched Telephone Network (PSTN).

The radio access network 100 comprises one or several base transceiver stations (BTS) 104, 106 and base station controllers (CNTL) 102. A BTS 104, 106 is responsible for providing an air interface radio connection 110, 108 to mobile terminals 112, 114 within its coverage area also known as a cell. The BTS 104, 106 also performs physical level signal processing like modulation, channel coding, etc. The BTS 104, 106 may also perform some basic radio resource management operations like operations related to power control.

A base station controller 102 is the network element that is responsible for the control of radio resources in the RAN 100. The base station controller 102 serves as a switching and controlling element of the RAN 100 and typically controls several BTSs 104, 106 but it may also control only a single BTS 104, 106. The base station controller 102 is responsible for controlling the load and congestion of traffic channels of the cells controlled by the base station controller 102. The base station controller 102 also takes care of procedures related to admission control, handovers, power control, and allocation of radio resources. The base station controller 102 typically includes a digital signal processor and software for executing computer processes stored on a computer readable medium. Furthermore, the base station controller 102 typically includes connecting means for exchanging electric signals with other network elements, such as other base station controllers and/or base stations, but also with the core network 112.

The core network 112 provides a combination of switching and transmission equipment, which together form a basis for telecommunication network services. The core network also performs procedures related to radio resource management. The core network 112 may provide circuit-switched and/or packet-switched data transport services to the user entities.

Figure 2:
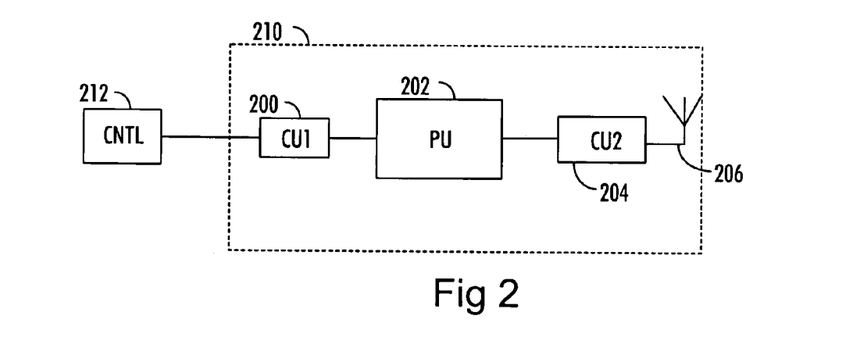
FIG. 2 illustrates an arrangement for power efficient data transmission according to an embodiment of the invention.

FIG. 2 illustrates an arrangement for power efficient data transmission according to an embodiment of the invention. The arrangement comprises a transmitter 210 and a controller 212. The transmitter 210 may be a base station 104 or 106 of the wireless telecommunication system of FIG. 1, and the controller may be a base station controller 102 of the wireless telecommunication system of FIG. 1. The transmitter 210 and the controller 212 may be separate devices but they may also be integrated together.

The transmitter 210 comprises a first communication unit 200 to provide a communication connection with the controller 212. The communication connection may be a wired connection utilizing a data transfer scheme known in the art.

The transmitter 210 further comprises a second communication unit 204 to provide a communication connection with one or more mobile terminals 112, 114. The second communication unit 204 may be configured to process transmitted data into signals to be transmitted according to the specifications of the wireless telecommunication system. The processing may include digital-to-analog conversion, mixing to a radio frequency (RF), filtering, and amplification. The signals are transmitted through one or more antennas 206. The communication unit 204 may be further configured to receive signals from mobile terminals in communication with the transmitter 210. The communication unit 204 may process the received radio signals into a form which is suitable for further processing.

The transmitter further comprises a processing unit 202 configured to control the operations carried out in the transmitter 210. The processing unit 202 may control specific operations according to commands received from the controller 212 through the first communication unit 200. The processing unit 202 may control other operations independently. The processing unit 202 may, for example, receive time slot allocation information from the controller 212 but control given transmit power control procedures independently. The processing unit 202 may be implemented with a digital signal processor with suitable software embedded on a computer readable medium, or with separate logic circuits, for example with ASIC (Application Specific Integrated Circuit). If the transmitter 210 and the controller 212 are integrated together, the controller 212 may be integrated into the processing unit 202. Accordingly, the first communication unit 200 may not be necessary.

Figure 3:
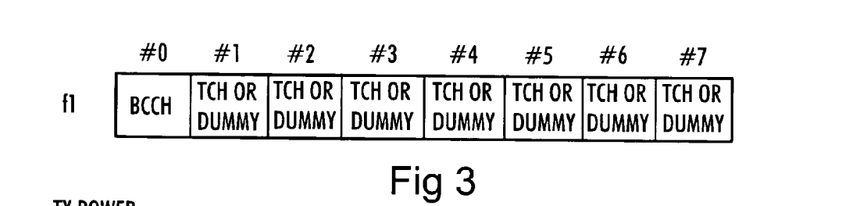
FIG. 3 illustrates the structure of a frame on a broadcast control channel frequency.

With reference to FIG. 3, let us examine the frame structure of a frequency band in which a broadcast control channel (BCCH) is transmitted. BCCH is a point-to-multipoint downlink channel which contains specific parameters needed by a mobile terminal in order that it can identify the radio access network and gain access to it. Typical information includes a location area code and a routing area code, a mobile network code and a BCCH allocation list. BCCH is typically broadcasted in the first time slot of a frame (time slot #0 in FIG. 3) on a given frequency (frequency f1 in FIG. 3). BCCH is used for frame synchronization, too.

The other time slots may be allocated, for example, to traffic channels, if there is data traffic to be transmitted. The other time slots may also be used for transmission of control signals. In some situations, there may not be data or control signals allocated to every time slot #1 to #7. According to the GSM standard provided by ETSI (European Telecommunications Standards Institute), a base station must, however, transmit RF power to an air interface on a BCCH frequency in every time slot in order to enable mobile terminals to detect the transmitted signal for paging or handover purposes. Furthermore, the transmission must be carried out with the maximum power level with respect to every time slot, whether or not there is a data or a control signal allocated to every time slot. Consequently, the base station transmits a "dummy burst" in time slots with no allocated data or control signal in order to generate the required RF power to the air interface. A dummy burst is a signal comprising data addressed to no specific mobile terminal being served. Any mobile terminal may, however, use the dummy burst for measuring the reception power level of a received dummy burst. This power level may be used for handover purposes as will be discussed later.

Evidently, the base station transmits RF signals which comprise no actual data or control information and are thus redundant from that point of view. The radio transmission influences considerably the power consumption of the base station. Measurements indicate a reduction of 70-80% in the power consumption of a base station with a transceiver in an idle mode when compared to a full transmit power mode. Maximum power consumption may be hundreds of Watts, which may be too high for a solar cell or a backup battery. Another consequence of high power consumption is heat which may affect the functionality of the base station. Increased heat requires cooling arrangements, which increase power consumption. In addition to the power consumption, transmission of dummy bursts with full power induces unnecessary interference to the air interface, which reduces the capacity and quality of service particularly in a high density radio access network where there are several base stations close to each other. The interference is co-channel interference which is caused by frequency re-use.

Figure 4:
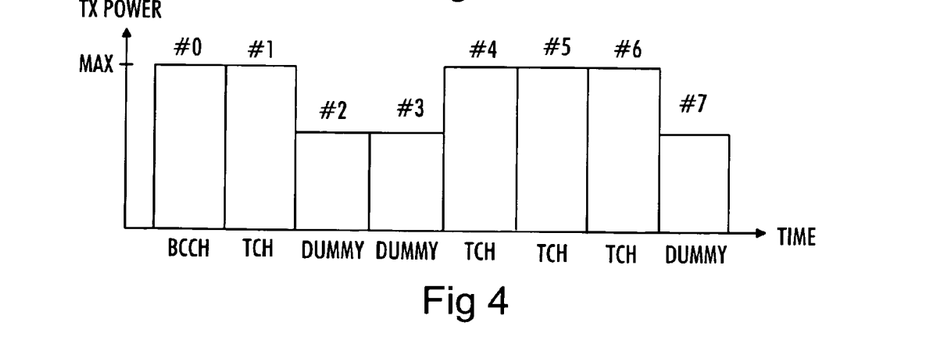
FIG. 4 illustrates transmit power distribution among time slots on the broadcast control channel frequency according to an embodiment of the invention.

FIG. 4 illustrates transmit power distribution among time slots on the broadcast control channel frequency according to an embodiment of the invention. The transmit power levels are determined on the basis of the contents of the time slots. FIG. 4 illustrates transmit powers used in transmission of each time slot #0 to #7. In time slot #0, a BCCH signal is transmitted with the maximum transmit power level. Time slots allocated to traffic channels, i.e. time slots #1, #4 to #6, may also be transmitted with a given power level, for example with the maximum power level. The time slots in which there is no allocated payload data, i.e. data or control information, may, however, be transmitted with a transmit power level which is lower than the maximum power level. Each empty time slot, i.e. time slot comprising no allocated data or control information, may be transmitted with the same, constant transmit power level or the power level of the empty time slots may be variable. The power level of the traffic channels may also be either constant or variable. Accordingly, the power adjustment according to an embodiment of the invention may be implemented to work with a conventional downlink transmit power control scheme. The transmit power level adjustment according to an embodiment of the invention may be implemented in a cellular telecommunication system in which a pilot signal is transmitted with a high transmit power level and in which dummy signal bursts or other corresponding pilot signal air interface channel structures are used for creating artificial traffic to the air interface when there are no actual data or control signals to be transmitted.

The power adjustment scheme according to an embodiment of the invention may be carried out on a continuous basis or it may be activated based on a specific criterion. Since the power adjustment scheme according to an embodiment of the invention reduces the power consumption of the transmitter, the power adjustment may be activated, for example, upon detection of a break in the mains power supply. When a base station, for example, operates with a backup battery during a power failure, reduced power consumption is invaluable for a prolonged operation of the radio access network. Typically, a power failure lasts only for a few minutes but in the case of a natural disaster, for example, power blackouts may last for hours. In such cases, it is important to provide radio access services as long as possible for human security reasons.

The power adjustment scheme according to an embodiment of the invention also reduces interference in the air interface due to a reduced transmit power of empty time slots. The interference in the air interface is due to the frequency reuse which is often employed in the wireless telecommunication systems. The interference is higher in high-density radio access networks in which cells are close to each other. The interference may be taken into account when designing the network by configuring given base station to utilize the transmit power level adjustment according to an embodiment of the invention. A base station may be configured to switch the transmit power level adjustment on or off according to commands received from either the base station controller or from the user interface of the base station. The transmit power level adjustment of a given base station may be switched on or off on the basis of measurements carried out in the network. If the measurements indicate a high interference level in a given cell, the base station(s) causing the interference may be instructed to switch on the transmit power level adjustment according to an embodiment of the invention. On the other hand, the transmit power level adjustment of a given base station may be switched off, if the operator of the network so desires. The corresponding commands to switch the transmit power level adjustment either on or off may be received through the user interface of the base station or through the base station controller.

The power adjustment scheme according to an embodiment of the invention may be used continuously by given base stations in the wireless telecommunication system. Accordingly, base stations may be provided with less expensive power sources, for example less expensive solar power sources, and new base stations may be installed in areas where previously it was not economically possible due to lack of a sufficiently powerful and low cost power source.

Figure 5:
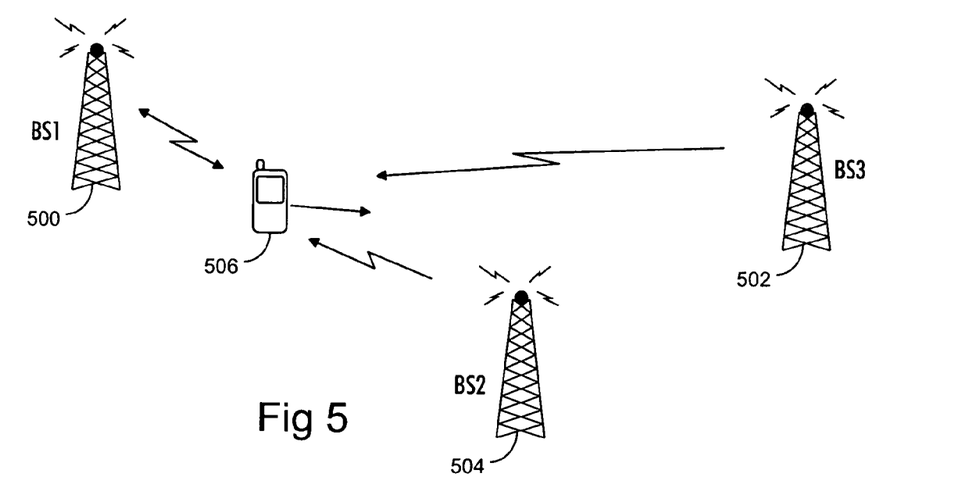
FIG. 5 illustrates a handover procedure.

The fact that the signals in the frequency of the BCCH are transmitted with a variable power level affects the handover procedure. FIG. 5 illustrates an air interface measurement procedure related to the handover procedure. Let us assume that a mobile terminal 506 is located within the service area of a first base station BS1 500 and is being served by the first base station 500. The mobile terminal 506 is moving towards the edge of a cell associated with the first base station 500 while measuring signals received from the serving base station 500 and from the neighboring base stations, i.e. the second base station BS2 504 and the third base station BS3 502. The mobile terminal measures reception power levels of the signals received from each of the base stations 500 to 504. Now, let us assume that the first and the second base station 500, 504 utilize transmit power adjustment in empty time slots, as described above. That is, the base stations 500, 504 transmit the empty time slots with a reduced transmit power. It is not necessary for the mobile terminal 506 to have knowledge whether or not a base station is using the transmit power adjustment described above. The mobile terminal 506 may simply measure a reception power level of a radio signal received from each of the base stations 500 to 504 and convey the measurement results to the radio access network for decision whether or not the mobile terminal 506 should be handed over to another base station. The mobile terminal 506 may transmit the measurement results through the serving base station, i.e. the first base station 500. The radio access network then analyzes the measurement results received from the mobile terminal 506 and determines whether or not the mobile terminal 506 should be handed over to the second or the third base station 504 or 503.

According to the prior art, the base stations transmit every time slot on a BCCH frequency with a constant transmit power level. Accordingly, each base station transmits with substantially the same transmit power level. Therefore, the reception power levels at the mobile terminal indicate directly the base station providing the best communication link. The radio access network may decide the target base station for the handover of the mobile terminal directly from the measurement results received from the mobile terminal. The radio access network may activate the handover of the mobile terminal when a sufficiently high reception power is received from a given base station (different than the serving base station) for sufficiently long period of time.

Now that a base station may vary the transmit power levels of signals in time slots on the BCCH frequency, this should be taken into account when considering the handover of the mobile terminal 506. As mentioned above, the first and the second base station 500 and 504 utilize the power adjustment of empty time slots according to an embodiment of the invention while the third base station 502 is a conventional base station transmitting with a constant transmit power level.

Figure 6:
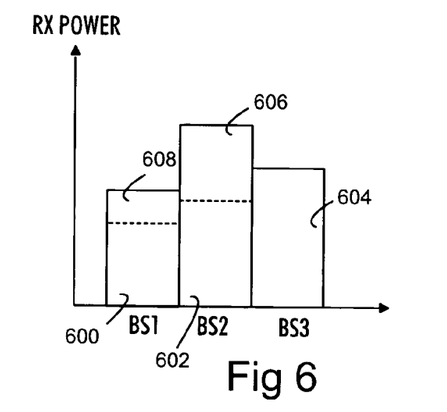
FIG. 6 illustrates reception power levels of signals received by the mobile terminal and compensation of the transmit power adjustment according to an embodiment of the invention.

FIG. 6 illustrates reception power levels of signals received by the mobile terminal and compensation of the transmit power adjustment utilized by the first and the second base station 500 and 504. The reception power levels of the radio signals received by the mobile terminal 506 from the base stations 500, 504, 502 are indicated with numerals 600, 602, and 604, respectively. Actually, the reception power level associated with the first and the second base station 500, 504 is indicated with the dashed line in FIG. 6. As can be seen, the reception power levels indicate that the third base station 502 would be the most suitable candidate for handover. This is, however, the case before the compensation of different average transmit powers of the base stations 500 to 504.

The compensation of transmit powers of the base stations 500 to 504 will be described next with reference to FIG. 6. The compensation may be made in the radio access network in conjunction with other processing related to the measurement results received from the mobile terminal 506. The processing and the compensation may be carried out in the controller 212 of FIG. 2. As mentioned above, the controller 212 may be a base station controller. The controller 212 has knowledge of the transmit powers of each of the base stations 500 to 504. The controller 212 may keep a record of the transmit powers of the base stations which vary their transmit powers or acquire the transmit powers in any other way known in the art. Therefore, the controller 212 may calculate the power level difference which should be added to the reception power level of the signal received by the mobile terminal. The power level differences associated with reception power levels of the first and the second base station 500 and 504 are denoted in FIG. 6 with numerals 608 and 606, respectively. The power level differences may be calculated, for example, by calculating the difference between the actual average transmit power of the base station 500 or 504 and the average transmit power, if every time slot has been transmitted with the maximum power level as by the conventional base station 502. The average transmit power refers to the time interval used for measuring the reception power level in the mobile terminal. This average transmit power difference is then added to the reception power level of the corresponding base station 500 or 504. Referring to FIG. 6, the calculated average transmit power level difference 608 of the first base station 500 is added to the reception power level 600 associated with the first base station 500. Correspondingly, the calculated average transmit power level difference 606 of the second base station 504 is added to the reception power level 602 associated with the second base station 504.

Figure 7:
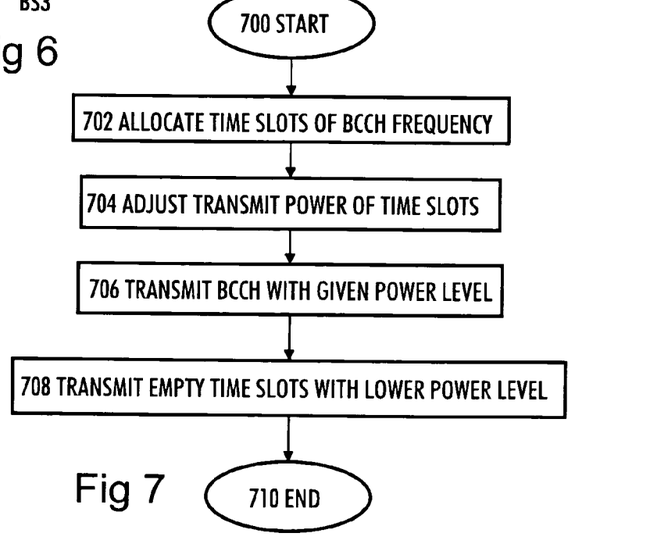
FIG. 7 is a flow diagram illustrating a data transmission process according to an embodiment of the invention.

Next, a data transmission process with the transmit power adjustment according to an embodiment of the invention is described with reference to the flow diagram of FIG. 7. The process may be carried out in a wireless telecommunication system in which the data transmission on a given frequency band is divided into a plurality of time slots. The process starts in block 700. In block 702, time slots in a given frequency band are allocated to a broadcast control channel and to other control or data traffic channels. The allocation may be carried out by a controller of a base station of the wireless telecommunication system. Then, transmit power levels of signals to be transmitted in the time slots are adjusted in block 704. The adjustment is carried out on the basis of whether or not there is a data or a control signal to be transmitted in a given time slot. The transmit power of the signal in the time slot allocated to the broadcast control channel may be adjusted to the maximum transmit power level of the base station, for example. The transmit power levels of signals in the time slots allocated to a traffic channel may also be adjusted to the maximum power level. The transmit power levels of the signals in the time slots allocated to no data or control channel, on the other hand, may be adjusted to the lower power levels, i.e. their transmit power levels are set to be lower than that of the broadcast control channel time slot, for example. In block 706, the broadcast control channel time slot is transmitted with the maximum power level. In block 708, the empty time slots are transmitted with the reduced transmit power level. The process ends in block 710.

Figure 8:
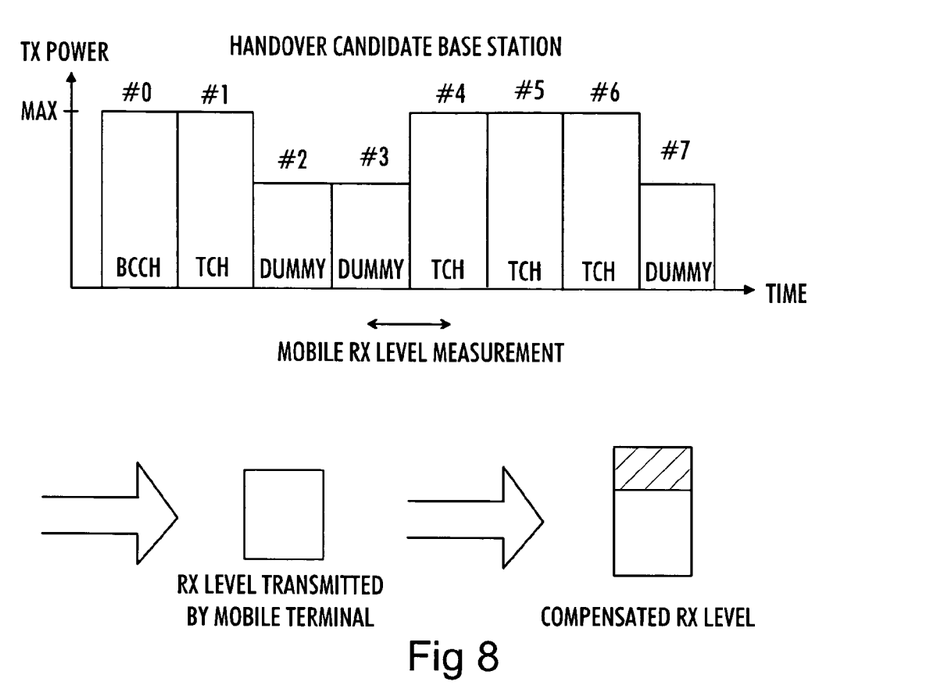
FIG. 8 illustrates reception power levels of signals received by the mobile terminal and compensation of the transmit power adjustment according to another embodiment of the invention.

In asynchronous mobile communication systems, there may arise a problem related to a mobile terminal measuring the power levels of signals received from handover candidate base stations. The operation of the mobile terminal may be synchronous with the serving base station but asynchronous with neighboring base stations, i.e. the handover candidate base stations. Therefore, the mobile terminal may carry out the measurement of reception power level without the knowledge of a frame clock of a handover candidate base station and whether the base station is transmitting with a full power level or with a reduced power level. Accordingly, part of the measurement may be carried out when the base station is transmitting with the full power level and part when the base station is transmitting with the reduced power level, as illustrated in FIG. 8. In FIG. 8, a base station transmits a dummy burst in time slot #3 with a reduced power level, and a traffic channel signal in time slot #4 with a maximum power level. The base station may be a handover candidate base station. The mobile terminal may measure a reception power level asynchronously with respect to the transmission of the base station and, accordingly, measure the reception power level during both time slots #3 and #4 and calculate the reception power level as an average value of the two reception power levels. In both cases, if the controller 212 does not have knowledge on the timing of the measurement, the controller 212 may carry out the compensation of transmit powers incorrectly, which may result in unnecessary handovers.

Observed time difference (OTD) is a mandatory measurement carried out by a mobile terminal of the GSM network. The OTD indicates the time difference between a frame clock of a base station serving the mobile terminal and a frame clock of a candidate base station. A base station controller controlling the serving base station may keep records of the OTDs observed by mobile terminals being served by the serving base station. Additionally, the base station controller may keep record of the behavior of the mobile terminals with respect to the measurement of the reception power levels. The base station controller may keep record of the time slot of the serving base station during which a mobile terminal measures the reception power level and the duration of the measurement. Accordingly, the base station controller has the knowledge on the timing of the reception power level measurement carried out by the mobile terminal as well as the transmit power level(s) of a transmission signal transmitted by a base station and received and measured by the mobile terminal. Thereby, the base station controller has the knowledge to appropriately compensate the reception power level received from the mobile terminal. The base station controller may have the behaviors of mobile terminals of different manufacturers stored into the memory unit of the base station controller. According to GSM specifications, mobile terminals transmit their type and manufacturer to the base station controller, and when the base station controller receives a mobile type and manufacturer information from a given mobile terminal, the base station controller may associate the received information with particular behavior stored into the memory unit.

The base station controller may determine the timing of the reception power level measurement of a mobile terminal from the behavior of the mobile terminal stored into the memory unit, the frame clock of a base station serving the mobile terminal, the length of time slots, the OTD received from the mobile terminal, and the duration of the measurement. The behavior of the mobile terminal may include information of the time slot during which the mobile terminal carries out the measurement and the delay from the beginning of the time slot to an actual starting point of the measurement. The OTD indicates the time difference between the serving base station and the handover candidate base station for which the reception power level measurement is being performed. Let us now assume that the mobile terminal has measured a reception power level of a signal transmitted from a candidate handover base station being asynchronous with the mobile terminal, and the mobile terminal has transmitted the reception power level to the base station controller. Let us further assume that the mobile terminal has carried out the measurement of the reception power level during two time slots (a first and a second time slot) of the handover candidate base station and that the handover candidate base station transmitted the first time slot with a first transmission power level and the second time slot with a second transmission power level different from that of the first time slot. Accordingly, the mobile terminal has measured a time-weighted average value of the reception power level and transmitted that to the base station controller. With the knowledge of the timing of the measurement and the transmission power levels during the measurement, the base station controller is able to compensate the reception power level information received from the mobile terminal, i.e. to process the received reception power level information to remove the effect of the variable transmission power level from the received reception power level information and to make the received reception power level information comparable with other reception power level information related to other candidate handover base stations (and the serving base station) received from the mobile terminal. With the knowledge of the timing of the measurement and transmission power levels of time slots used for measuring the reception power level, the base station controller is able to scale the received reception power level to a level which indicates the reception power level of a signal transmitted with full transmission power level. Similarly, the base station controller may scale the other reception power levels related to the other base stations and received from the mobile terminal to the level which indicates the reception power level of a signal transmitted with full transmission power level. Then, the base station controller may decide on the basis of the scaled reception power levels, whether or not to initiate a handover procedure.

Figure 9:
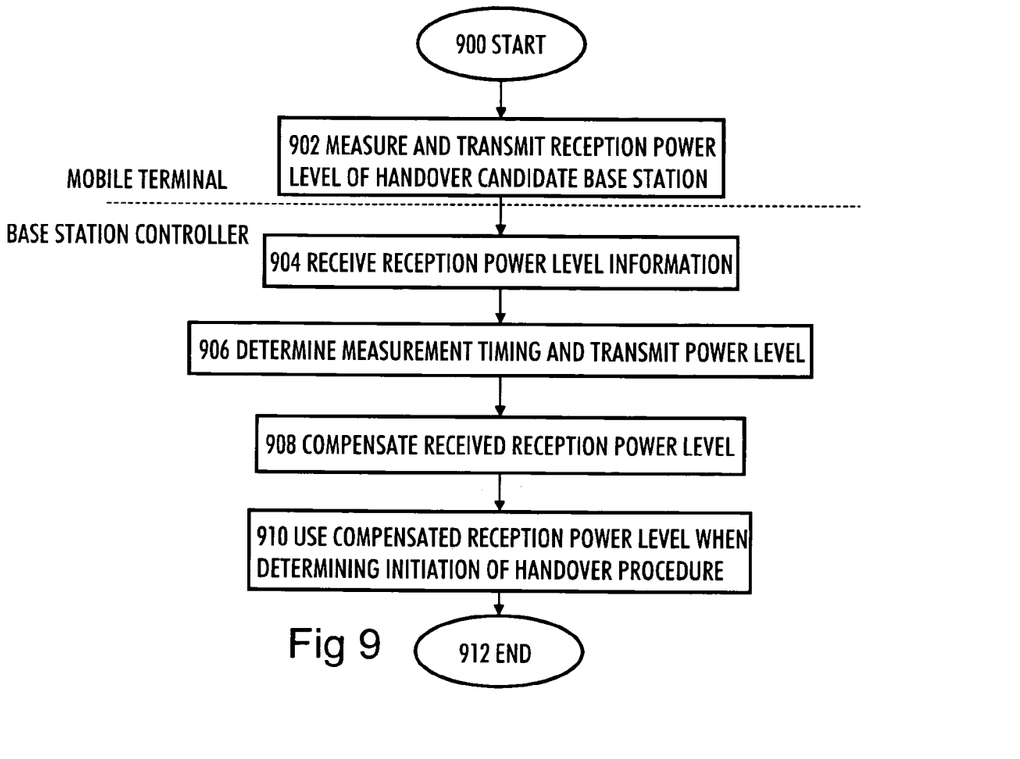
FIG. 9 is a flow diagram illustrating a process for compensating reception power level information according to an embodiment of the invention.

Next, a data transmission process with the transmit power adjustment according to an embodiment of the invention is described with reference to the flow diagram of FIG. 9. The process may be carried out in a controller of a base station of a wireless telecommunication system. Base stations of the wireless telecommunication system may operate asynchronously with respect to each other. The process starts in block 900. In block 902, a mobile terminal measures a reception power level of a signal received from a handover candidate base station and transmits the measured reception power level to a controller of a base station serving the mobile terminal.

In block 904, the controller receives the reception power level information from the mobile terminal. In block 906, the controller determines the timing of the measurement carried out by the mobile terminal and transmission power level of the handover candidate base station during the measurement. This knowledge may be stored into a memory unit of the controller. In block 908, the controller compensates the received reception power level in order to remove the effect of variable transmission power level during the measurement and to obtain knowledge of the reception power level in case the handover candidate base station transmits with full transmission power. The compensation may comprise scaling the reception power level make the reception power level comparable with reception power level information associated with the serving base station and other handover candidate base stations utilizing transmission power adjustment according to embodiments of the invention. Then, the controller utilizes the compensated reception power level information in block 910 to determine, whether or not to initiate a handover procedure. In addition to the particular reception power level described above, the controller may receive from the mobile terminal reception power levels associated with the serving base station and other handover candidate base stations, compensate these reception power levels, and use the compensated reception power levels when determining the initiation of the handover procedure. The process ends in block 912.

The embodiments of the invention described above may be generalized into cellular telecommunication systems transmitting pilot signals continuously. In code division multiple access (CDMA) based telecommunication systems, for example, a pilot signal is transmitted continuously on a pilot channel from each base station of a radio access network of the telecommunication system. The pilot channel is discriminated with a specific spreading code. According to an embodiment of the invention, a base station of such telecommunication system may transmit the pilot signal according to a specific transmit power pattern. The base station may be configured to transmit the pilot channel with a variable transmit power level. The base station may be configure to transmit each frame with a given transmit power level and the transmit power levels of different frames may differ from each other. For example, the base station may transmit every second frame with a reduced transmit power level. The form of the transmit power level pattern may be case specific and, thus, vary between different base stations. The transmit power level pattern may be stored in a memory unit of the base station. The transmit power level pattern may describe the transmit power levels on a frame level or even on a time slot level. Consequently, the transmit power level pattern does not necessarily describe a constant transmit power level to be used for the present but it may describe a variable transmit power level pattern for the pilot signal.

The embodiments of the invention may be realized in an arrangement comprising a controller and a transmitter operationally connected to the controller. The arrangement may be configured to perform at least some of the steps described in connection with the flowchart of FIG. 7 and in connection with FIGS. 4 and 6. The embodiments may be implemented as a computer program comprising instructions for executing a computer process for data transmission in a wireless telecommunication system in which the data transmission on a given frequency band is divided into a plurality of time slots. Some parts of the computer program may be carried out in the controller and other parts in the transmitter.

Embodiments of the invention related to reception and processing handover-related information may be realized in a controller of a base station of a wireless communication network. The controller may be configured to perform at least some of the steps described in connection with the flow-chart of FIG. 9 and in connection with FIG. 8. The embodiments may be implemented as a computer program comprising instructions for executing a computer process.

The computer programs may be stored on computer program distribution media-readable by a computer or a processor. A computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
allocating, in a wireless telecommunication system in which the data transmission on a given frequency band is divided into a plurality of time slots, at least a portion of the time slots of the frequency band to a broadcast control channel and at least one different channel;
adjusting a transmit power level of at least one time slot in a different channel on the basis of contents of the time slot in the different channel;
transmitting a broadcast signal with a given transmit power in a time slot allocated to the broadcast control channel;
transmitting a signal with the adjusted transmit power level in the time slot of the different channel;
decreasing the transmit power level of a time slot for which there is no payload data allocated for transmission; and
transmitting a signal in the time slot with a lower transmit power level than that of the broadcast signal.

2. The method of claim 1, wherein the power level adjustment is performed together with a conventional downlink power control scheme associated with traffic channels.

3. The method of claim 1, wherein the transmit power level adjustment is performed in a base station of a radio access network of the wireless telecommunication system.

4. The method of claim 3, further comprising activating the transmit power level adjustment upon detection of a break in a mains power supply.

5. The method of claim 1, further comprising switching the power level adjustment on or off upon reception of a corresponding command and assigning the same power level to signals in every time slot in the frequency band when the power level adjustment has been switched off.

6. The method of claim 1, further comprising adjusting handover parameters related to a mobile terminal in the service area of the radio access network on the basis of the power adjustment being currently used in order to compensate for a reduction in the transmit power level for handover purposes.

7. The method of claim 6, further comprising:
receiving handover measurement values from the mobile terminal, each measurement value being associated with a base station of the radio access network and describing the power level of a radio signal received by the mobile terminal from the corresponding base station, and
weighting each handover measurement value by increasing the handover measurement value in proportion to the degree of power adjustment, if the base station utilizes the power adjustment.

8. The method of claim 6, further comprising:
receiving a handover measurement value from the mobile terminal, the handover measurement value describing the power level of a radio signal received by the mobile terminal from a candidate base station;
obtaining, from stored information concerning the behavior of the mobile terminal, knowledge on a serving base station time slot during which the mobile terminal measured the handover measurement value;
receiving from the mobile terminal timing information observed by the mobile terminal and indicating a time difference between frame clocks of a serving base station and the handover candidate base station for which the handover measurement value was measured;
compensating the received handover measurement value according to the knowledge on the transmit power level of the handover candidate base station during the measurement of the handover measurement value, and
determining, on the basis of compensated reception power level measurement information, whether or not to initiate a handover procedure for the mobile terminal.

9. The method of claim 8, further comprising:
determining the number of time slots of the handover candidate base station during which the mobile terminal measured the handover measurement value,
determining the transmit power level of the candidate handover base station for each time slot during which the mobile terminal measured the handover measurement value, and
compensating the received handover measurement value according to the transmit power levels of the time slot or time slots during which the mobile terminal measured the handover measurement value.

10. A system, comprising:
a controller configured to divide data transmission on a given frequency band into a plurality of time slots and allocate at least a portion of the time slots of the frequency band to a broadcast control channel and at least one different channel, and
a transmitter configured to adjust a transmit power level of at least one time slot in a different channel on the basis of contents of the time slot in the different channel, transmit a broadcast signal with a given transmit power in a time slot allocated to the broadcast control channel, and transmit a signal with the adjusted transmit power level in the time slot of the different channel, wherein the transmitter is configured to adjust the transmit power level by decreasing the power level of a time slot for which there is no data or a control signal allocated for transmission and to transmit the signal in the time slot with a lower transmit power level than that of the broadcast signal.

11. The system of claim 10, wherein the transmitter is configured to implement the transmit power level adjustment together with a conventional downlink power control scheme associated with the traffic channels.

12. The system of claim 10, wherein the transmitter is a base station of the wireless telecommunication system and the controller is a base station controller connected to the base station and controlling the operation of the base station.

13. The system of claim 10, wherein the transmitter is configured to activate the transmit power level adjustment upon detection of a break in a mains power supply.

14. The system of claim 10, wherein the transmitter is configured to switch the power level adjustment on or off upon reception of a corresponding command and to assign the same power level to signals in every time slot in the frequency band when the power level adjustment has been switched off.

15. The system of claim 10, wherein the controller is configured to adjust handover parameters related to a mobile terminal in the service area of the radio access network on the basis of the transmit power level adjustment being currently used in order to compensate for the reduction in a power level for handover purposes.

16. The system of claim 15, wherein the controller is configured to receive handover measurement values from the mobile terminal, each measurement value being associated with a base station of the radio access network and describing a power level of a radio signal received by the mobile terminal from the corresponding base station, and to give a weight for each handover measurement value by increasing the handover measurement value in proportion to the degree of power adjustment, if the transmitter utilizes the transmit power level adjustment.

17. The system of claim 15, wherein the controller is configured to receive from the mobile terminal a handover measurement value describing the power level of a radio signal received by the mobile terminal from a candidate base station, obtain, from information stored into a memory unit of the system and concerning the behavior of the mobile terminal, knowledge on a serving base station time slot during which the mobile terminal measured the handover measurement value, receiving from the mobile terminal timing information observed by the mobile terminal and indicating a time difference between frame clocks of a serving base station and the handover candidate base station for which the handover measurement value was measured, compensate the received handover measurement value according to the knowledge on the transmit power level of the handover candidate base station during the measurement of the handover measurement value, and determine, on the basis of compensated reception power level measurement information, whether or not to initiate a handover procedure for the mobile terminal.

18. The system of claim 17, wherein the controller is configured to determine the number of time slots of the handover candidate base station during which the mobile terminal measured the handover measurement value, determine the transmit power level of the candidate handover base station for each time slot during which the mobile terminal measured the handover measurement value, and compensate the received handover measurement value according to the transmit power levels of the time slot or time slots during which the mobile terminal measured the handover measurement value.

19. A base station controller apparatus, comprising: a processor; and a memory including computer program code, the memory and the computer program code configured to, with the processor, cause the base station controller apparatus at least configured to divide data transmission on a given frequency band into a plurality of time slots and allocate at least a portion of the time slots of the frequency band to a broadcast control channel and at least one different channel, to decrease a transmit power level of at least one time slot in a different channel on the basis of contents of the time slot in the different channel, and to control a base station to transmit a broadcast signal with a given transmit power in a time slot allocated to the broadcast control channel and a signal with the decreased transmit power level in the time slot of the different channel.

20. A base station, comprising:
a first communication unit connected to a controller of the base station;
a second communication unit configured to transmit and receive radio signals, and
a processing unit configured to receive through the first communication unit a command to allocate at least a portion of the time slots of the frequency band to a broadcast control channel and at least one different channel, control the second communication unit to transmit a broadcast signal with a given transmit power in a time slot allocated to the broadcast control channel, decrease a transmit power level of at least one time slot in a different channel on the basis of contents of the time slot in the different channel, and control the second communication unit to transmit a signal with the decreased transmit power level in the time slot of the different channel.

21. A system, comprising:
means for allocating at least a portion of time slots of a frequency band to a broadcast control channel and at least one different channel;
means for decreasing a transmit power level of at least one time slot in a different channel on the basis of contents of the time slot in the different channel;
means for transmitting a broadcast signal with a given transmit power in a time slot allocated to the broadcast control channel, and
means for transmitting a signal with the decreased transmit power level in the time slot of the different channel.

22. A computer program distribution medium readable by a computer and encoding a computer program of instructions for executing a computer process for data transmission in a wireless telecommunication system in which the data transmission on a given frequency band is divided into a plurality of time slots, the process comprising:
allocating at least a portion of the time slots of the frequency band to a broadcast control channel and at least one different channel;
decreasing a transmit power level of at least one time slot in a different channel on the basis of contents of the time slot in the different channel;
transmitting a broadcast signal with a given transmit power in a time slot allocated to the broadcast control channel, and
transmitting a signal with the decreased transmit power level in the time slot of the different channel.

23. The process of claim 22, the distribution medium including at least one of the following media: a computer readable medium, a program storage medium, a record medium, a computer readable memory, a computer readable software distribution package, a computer readable signal, a computer readable telecommunications signal, and a computer readable compressed software package.

24. A base station controller apparatus, comprising:
communication means for providing a communication connection with one or more base stations controlled by the base station controller apparatus and transmitting signals in time slots with variable transmit power levels under the control of the base station controller apparatus;
memory means capable of storing information;
means for storing into the memory means information on the transmit power levels of the one or more base stations;
means for receiving, through the communication means from a mobile terminal served by a serving base station, reception power level measurement information related to signals received by the mobile terminal from the serving base station and from one or more handover candidate base stations;
means for obtaining knowledge on transmit power levels of the signals measured by the mobile terminal,
means for compensating the received reception power level measurement information according to the knowledge on the transmit power levels, and
means for determining, on the basis of compensated reception power level measurement information, whether or not to initiate a handover procedure for the mobile terminal, wherein the transmit power level is decreased of a time slot for which there is no data or a control signal allocated for transmission and a signal is transmitted in the time slot with a lower transmit power level than that of the broadcast signal.

25. A computer program distribution medium readable by a computer and encoding a computer program of instructions for executing a computer process, comprising:

receiving, from a mobile terminal served by a serving base station, reception power level measurement information related to signals received by the mobile terminal from the serving base station and from one or more handover candidate base stations, wherein the base stations transmit signals in time slots with variable transmit power levels;

obtaining knowledge on transmit power levels of the signals measured by the mobile terminal;

compensating the received reception power level measurement information according to the knowledge on the transmit power levels, and determining, on the basis of compensated reception power level measurement information, whether or not to initiate a handover procedure for the mobile terminal, wherein a transmit power level is decreased of a time slot for which there is no data or a control signal allocated for transmission and a signal is transmitted in the time slot with a lower transmit power level than that of the broadcast signal.

* * * * *